Figure 1:
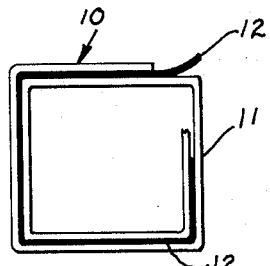

Jan. 21, 1964  I. V. TIEJEMA  3,119,085
WELDING TRANSFORMER
Filed Sept. 26, 1960  2 Sheets-Sheet 1

INVENTOR.
IRWIN V. TIEJEMA
BY Price and Heneveld
ATTORNEYS

United States Patent Office 3,119,085
Patented Jan. 21, 1964

3,119,085
WELDING TRANSFORMER
Irwin V. Tiejema, Comstock Park, Mich., assignor to Kirkhof Manufacturing Corporation, Grand Rapids, Mich., a corporation of Michigan
Filed Sept. 26, 1960, Ser. No. 58,400
1 Claim. (Cl. 336—96)

This invention relates to transformers, and more particularly to welding transformer insulation and bonding.

The application of plastic insulation materials to electrical apparatus, including transformers, condensers, and the like, is well-known in the art. For example, resins containing a polyester material along with epoxide resin have been used to impregnate and coat electrical motors, coils, transformers and condensers. In order to effectively insulate these electrical items, various satisfactory methods have been devised to apply the resins. These methods have not satisfactorily solved the problem of handling the toxic epoxy materials, however.

Furthermore, unusual problems arise in the manufacture of the special type of transformers commonly known as welding transformers. These transformers have peculiar heating characteristics due to the unusual function which they must perform. Furthermore, they are exposed to conditions and stresses which are completely unknown to ordinary power transformers and other coils of similar nature since coils of a welding transformer are exposed to frequent spasmodic high current surges. These surges impart large magnetic forces to the coil and thereby produce a series of jerking distortion stresses on the coil. If any of the coil windings break loose from the potting compound under these stresses, the heat transfer path to the coolant is interrupted and the air pocket produced will cause a burn-out of the windings in a short time due to the insulation properties of air. This burn-out is caused by the break in the heat transfer pattern from the primary to the secondary coils, the latter of which are water cooled by the forced flow of water through the hollow interior thereof. These burn-out failures are chiefly caused by the lack of an adequate bonding of the welding transformer coils. Not only is it important that all tiny interstices be filled to bond the windings completely, but initial insulating air pockets must also be eliminated since burn-out would readily occur. A further problem which occurs in transformers used for welding is the continuous high current surge which passes through the windings when the welding electrode tips stick to the work. Such sticking causes direct constant short out, thus exposing the unit to very adverse conditions.

It is, therefore, an object of this invention to provide a welding transformer which can withstand the conditions to which it is exposed during normal production operation, and the extreme conditions to which it is subjected when the controls malfunction.

It is a further object of this invention to provide a welding transformer which can withstand a rapid series of very high current surges without breakdown of the heat-transferring bond between windings.

Further, it is an object to provide a transformer whose coil windings are thoroughly penetrated with a bonding agent of extreme holding capabilities, and yet which has excellent electrical insulation and heat dissipation properties.

A further object of this invention is to provide a method of forming such a transformer by techniques which produce an item having a larger capacity for a given size than known heretofore due to the filling of even minute interstices in the winding with the bonding and insulation agent.

Further, it is an object to provide a method of forming transformers whereby an epoxy resin is allowed to penetrate interstices of the winding and to bond thereto due to preheating conditions.

Further objects will be apparent from a reading of the following specification as supplemented by the accompanying drawings.

Figure 2:
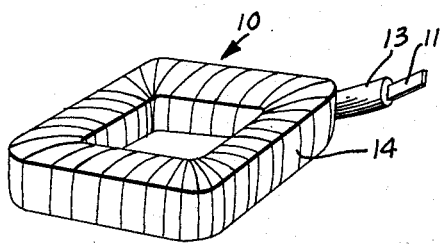
Figure 3:
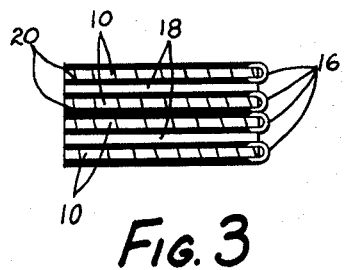
Figure 6:
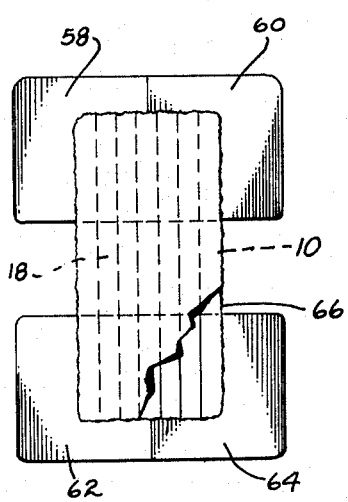
Figure 5:
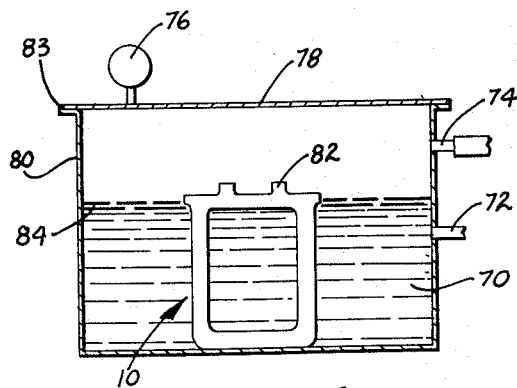
Figure 4:
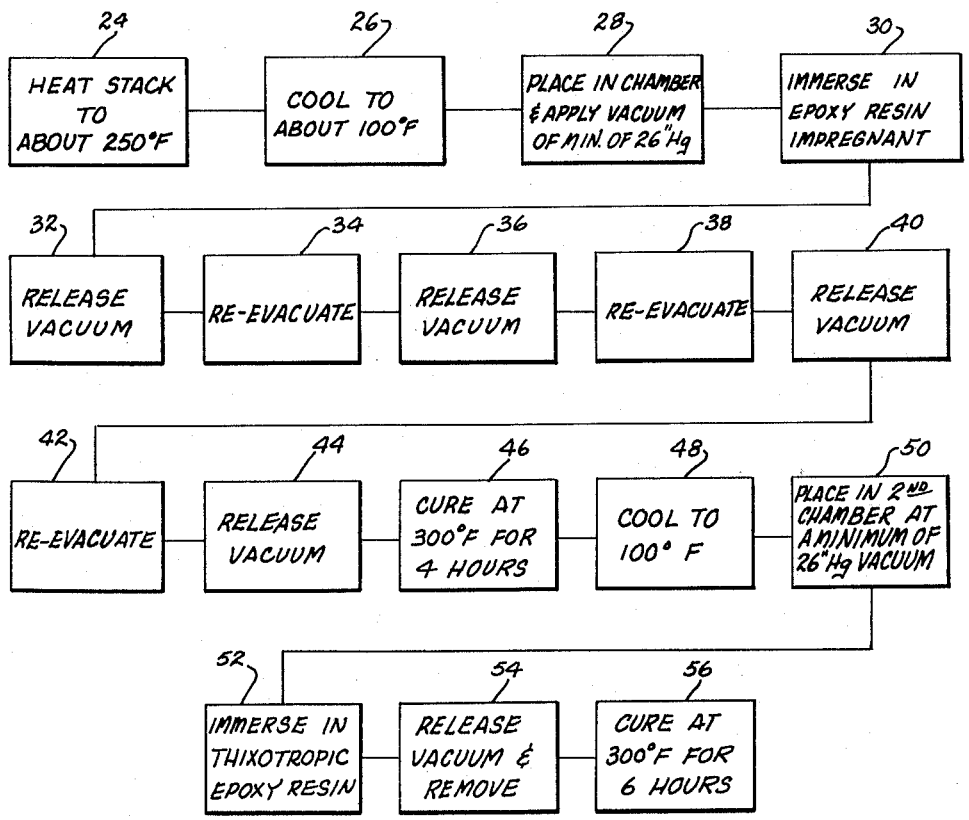

In the drawings:
FIG. 1 is a side elevational view of the partially wound primary coil;
FIG. 2 is a perspective view of the wound primary coil with insulation tape wrapped thereon;
FIG. 3 is a plan view of the stacked primary and secondary coils showing the interlayered sheets of insulation;
FIG. 4 is a block diagram of the impregnating and coating operational sequence;
FIG. 5 is a sectional view of the dipping tank showing the immersed stack of coils;
FIG. 6 is a plan view of the finished coated stack of impregnated windings with the magnetic cores in place.

This invention comprises a method of potting welding transformers by impregnating as a unit the interstices of a stack of wound secondary and primary coils with an epoxy resin by the pumping action of a series of evacuation and vacuum release steps. Also it comprises winding porous insulation tape between the turns of the primary coils so that the impregnating resin saturates the tape which serves as an anchor material, and enveloping the ends of the primary coils to prevent arcing to the secondary coils.

Referring particularly to FIG. 1, the numeral 10 designates a welding transformer primary coil including a winding 11 with insulation tape 12 wound into the coil between each turn and its adjacent turn on a conventional winding machine. The winding is made of the usual copper alloys or their known substitutes and the tape is preferably a woven fiber glass material, although other tapes with equivalent electrical insulation properties could be substituted for woven fiber glass tape.

In FIG. 2 is again shown the wound coil 10 which has been wrapped with insulation tape 14 which also is preferably a woven fiber glass material, although here again known substitutes for this material could be utilized without detracting from the invention. The wrapping tape 14 may be applied by hand or by other conventional methods.

The numeral 13 designates a separate sleeve of insulation material which is placed around the innermost (not shown) and the outermost turns before the wrapping material 14 is applied to the coil 10 to thoroughly electrically insulate the lead portions of the coil.

FIG. 3 shows a stack of primary coils 10 interspersed with internally cooled secondary coils 18, the latter being formed in a conventional manner, e.g., by casting. It will be noted that spaced between each of the adjacent coils is a sheet of relatively stiff electrical insulation material 20. Also, to be noted, are the folds 16 of flexible insulation material which envelope the ends of the primary coils 10 upon which the secondary lugs are joined to the secondary coils. These folds are preferably of Cyno-Glas or Isoglass, which are commercial types of a flexible polyurethanetreated glass fabric. Conventional polyurethane materials formed from a polyisocyanate and a polyester may be used, such as tolylene diisocyanate and an ester of ethylene glycol and adipic acid. This material prevents short-circuits between the coils and the secondary lugs.

Referring now to FIG. 4, the block diagram shown discloses basically the impregnating and coating steps of the present process. After coil 10 has been wound with the tape 12, wrapped with the tape 14, and stacked with the secondary coils 18 with interposed insulation sheets 20 and end folds 16, the stack is ready to be heated. The stack of primary and secondary windings may utilize the arrangement shown in FIG. 3 or any other suitable arrangement which is dictated by electrical engineering principles as applied to the application desired.

Before the heating and coating process, the stack of coils shown in FIG. 3 is preferably clamped together by any conventional means and then placed into an oven to be pre-heated to a temperature of about 230 to 250 degrees F., preferably 250 degrees F., as at 24 in the diagram, for approximately one-half hour. Prior to placing the units in the pre-heat oven, the leads of the coils are preferably coated with a protective material which may be later stripped off so that the epoxy resin will not form thereon as it is very difficult to remove. This step is important in order to substantially drive off all moisture, thereby facilitating complete bonding. The assembly is then removed from the oven and cooled (26) to about 100 degrees F. This cooling step is necessary to prevent curing of the epoxy resin when the stack is dipped into the resin bath. Such a premature curing would prevent the thorough penetration required.

After cooling, the assembly is then placed (28) into a reaction chamber which must be tightly sealed. In this chamber the unit will be exposed to a "pumping" action which is an important part of this invention. The pumping is caused by control of the pressure steps.

An evacuation chamber suitable for use with the present invention is shown in FIG. 5. The container 80 may be made of a suitable metal of a thickness to withstand a high vacuum. The top 78 is made of Plexiglas of about 1" thickness or any other material capable of withstanding pressure. Obviously this is not critical. Around the edge 83 of the top is placed a sealing gasket such as a rubber ring capable of allowing a large vacuum to be drawn on the container. Vacuum and pressure release outlet 74 is provided on the container 80. The absolute pressure is indicated by gauge 76 mounted in the top 78. Resin inlet 72 facilitates immersion of the stacked coils 10 in resin 70 after evacuation of the chamber. The stack 10 is immersed during the process up to the terminal lugs 82 by controlling the inlet level 84 as will be explained more fully hereinafter. The chamber is first evacuated to approximately 26 inches of mercury vacuum for about five minutes with the assembled unit inside. The amount of vacuum is not extremely critical but should not be considerably less than the stated amount since thorough penetration of the resin to be added will not result. It should not be considerably greater since the epoxy material to be added must not be allowed to boil. After the vacuum is held for approximately five minutes as stated above, the epoxy resin which is in the uncured state is allowed to flow (30) into the chamber to immerse the suspended stacked and clamped coils up to the usual terminal lugs 82. The vacuum of 26 inches of mercury is then held with the unit in the immersed condition for approximately four minutes. This time may vary somewhat but four minutes has been found to be an optimum time for a unit composed of a stack of assembled coils nine to ten inches high, approximately six inches wide, seven-eighths of an inch thick and from ten to fourteen inches long. The vacuum is then released (32) for approximately one minute. This constitutes the first step in the pumping action.

After the initial evacuation and vacuum release steps, the chamber containing the assembled unit is again evacuated (34) to about twenty-six inches of mercury vacuum for approximately four minutes. The vacuum is again released (36) for one minute. This evacuation step and vacuum release step is repeated at least two more times (38, 40, 42, 44) to make a total of at least twenty minutes of pumping action. This pumping action separates all air bubbles from the assembled unit and causes thorough penetration of the openings and interstices by the epoxy to form a solid bond.

After the pumping action is complete, the assembled unit is removed from the chamber and cured at approximately 300 degrees F. for about four hours (46). The unit is then again cooled to approximately 100 degrees F. (48) prior to a second immersion step. The assembled coils are then placed in a second evacuation chamber (50) which is sealed tightly and evacuated to about 26 inches of mercury vacuum for approximately five minutes. A second epoxy resin containing a thixotropic agent to impart thixotropic properties to the combination for encapsulation is then allowed to flow into the chamber (52) so as to immerse the coils. The immersed coils in the thixotropic resin are then held under the vacuum of 26 inches of mercury for about 15 minutes. The vacuum is then broken (54) and the unit drained of any excess resin. This imparts a thin encapsulating coating upon the coil and serves as a further insulation means. This coating material is then cured (56) at 300 degrees F. for approximately six hours. The resulting unit is thoroughly penetrated in a manner unknown heretofore to produce a welding transformer which stands up excellently under extreme conditions of mechanical and magnetic stress, elevated temperatures, high electrical potential, and corrosive atmospheres.

The epoxy resin used to impregnate the coils in the first immersion step may be the well-known glycidyl polyether formed by the reaction of epichlorohydrin and Bisphenol A. One of the known heat-curing hardeners or cross-linkers of aromatic amines or acid anhydrides such as hexahydrophthalic anhydride may be used during the heat curing of the resin.

In order to impart thixotropic properties to the resin in the second immersion bath, finely divided inorganic materials such as mica flakes, asbestos, silica, chopped glass, zirconium oxide, or other non-reacting materials in the range of 10% to 50% by weight of the solid may be used in the above resin.

Referring now to FIG. 6, it is there shown how the stacked and coated coils are then assembled with a series of U-shaped core members 58, 60, 62 and 64. A portion of the figure is broken away to show the adjacent coils. Also, it is shown how the epoxy coating 66 completely encapsulates the coils 10 and 18. It is one of the features of this invention that the coils be impregnated and coated entirely separate from the core members in order that thorough penetration of the coating and bonding material be had. Thus, the assembly of the core units onto the coil units is purposely postponed until after the impregnating and coating steps are finished. The unit as shown in FIG. 6 may then be placed in a conventional casing with additional insulating and mechanical support as desired. A unit formed by the above process and with the above described features presents a very compact unit which has a power output greatly increased over the prior known types of welding transformers without increasing the size of the unit and without danger of failure. The epoxy resins used are known as good electrical insulators and heat conductors and these factors are not claimed to be novel by the inventor. However, the inventor has discovered a new and unobvious method of utilizing such advantageous materials to form a welding transformer of outstanding characteristics. Such a welding transformer may be exposed to extremely severe conditions of use with little concern over failure due to overheating and shorting out as had been previously experienced. The bonding ability of such a woven fiber-glass material as thoroughly impregnated with an epoxy resin by the above described process anchors the windings in spite of the spasmodic magnetic forces causing severe stresses upon the unit. Further, there is no need to dip the individual coils as often done in the prior art. The unit as an entirety may be completely penetrated with no necessary handling of the toxic epoxy materials involved.

Thus, it is seen that there is disclosed a very advantageous welding transformer assembly and method of making such assembly. Various obvious modifications of the unit or of the method may be made without departing from the spirit of this invention. Applicant fully intends to include these within his invention, such invention being limited only by the scope of the attached claim and the equivalents thereto.

I claim:

A welding transformer comprising: a stack of a plurality of wound primary coils and a plurality of cast secondary coils operatively interspersed with each other; each of said primary coils having a series of windings with the turns thereof wound one upon the other and spaced by a continuous insulating strip impregnated with an epoxy-based resin, and being bonded to said resin impregnated strip; each primary coil formed of said windings and strip being tightly and completely wrapped in a strong insulating tape impregnated with an epoxy-based resin; all of said coils in said stack being spaced from adjacent coils by relatively stiff, resin impregnated insulating sheets, and being bonded to said sheets; the peripheral edges of said primary coils being enveloped by U-shaped folds of a resin impregnated insulating cloth with the legs of the U being held between adjacent coils; said stack of coils, strips, sheets, and folds being coated and bonded together by a thermo-setting resin; and a plurality of U-shaped cores around said coated coils.

References Cited in the file of this patent

UNITED STATES PATENTS

| | | |
|---|---|---|
| 1,864,331 | Whitesmith | June 21, 1932 |
| 2,279,771 | Austin | Apr. 14, 1942 |
| 2,476,049 | Leitch | July 12, 1949 |
| 2,478,633 | Lord | Aug. 9, 1949 |
| 2,549,309 | Hill et al. | Apr. 17, 1951 |
| 2,780,742 | Jenner et al. | Feb. 5, 1957 |
| 2,839,434 | Haughney et al. | July 17, 1958 |
| 2,985,854 | Brosh | May 23, 1961 |